10/22/85 OR 4,548,625

SR

United States Patent [19]

Ishida et al.

[11] Patent Number: 4,548,625

[45] Date of Patent: Oct. 22, 1985

[54] EXHAUST GAS CLEANING DEVICE FOR DIESEL ENGINES

[75] Inventors: Yasuhiko Ishida, Mishima; Taiichi Mori, Susono; Shigeyuki Hikita; Tamotsu Horiba, both of Aichi, all of Japan

[73] Assignees: Toyota Jidosha Kabushiki Kaisha; Kabushiki Kaisha Tokai Rika Denki Seisakusho, both of Aichi, Japan

[21] Appl. No.: 629,572

[22] Filed: Jul. 11, 1984

[51] Int. Cl.[4] .......................... B01D 39/20; F01N 3/02; F01N 3/36

[52] U.S. Cl. .......................................... 55/282; 55/466; 55/DIG. 10; 55/DIG. 30; 422/178; 60/300; 60/303; 60/311

[58] Field of Search .................. 55/282, 466, DIG. 10, 55/DIG. 30; 422/174, 178; 219/374, 375, 381, 382, 532, 552; 174/138 J, 156, 157, 175; 338/315-320; 60/295, 299, 300, 303, 311

[56] References Cited

U.S. PATENT DOCUMENTS

| | | | |
|---|---|---|---|
| 342,324 | 5/1896 | Brandon | 174/156 |
| 469,940 | 3/1892 | Hammond | 174/175 |
| 508,687 | 11/1893 | Duggan | 174/157 |
| 1,177,996 | 4/1916 | Curry et al. | 174/157 |
| 2,426,466 | 8/1947 | Minarik | 174/156 |
| 3,920,887 | 11/1975 | Kloos et al. | 338/317 |
| 3,963,859 | 6/1976 | Petersen et al. | 338/317 |
| 4,250,399 | 2/1981 | King | 174/138 J |
| 4,427,418 | 1/1984 | Kogiso et al. | 55/DIG. 10 |
| 4,449,016 | 5/1984 | Best | 174/138 J |

FOREIGN PATENT DOCUMENTS

| | | | |
|---|---|---|---|
| 195814 | 12/1982 | Japan | 60/300 |
| 108217 | 7/1983 | Japan . | |

*Primary Examiner*—David L. Lacey
*Attorney, Agent, or Firm*—Parkhurst & Oliff

[57] ABSTRACT

An exhaust particle cleaning device for a diesel engine includes a trap case provided in a flow conduit for the exhaust gas. A filter is disposed in the trap case so that carbon particles or other exhaust particles contained in the exhaust gas can be caught in the filter material when the exhaust gas is passed through the filter. A plurality of electric heating wires are spread over the upstream end face of the filter so that the exhaust gas passes through the areas defined between the plurality of heating wires. These heating wires are supported by insulator arms so as to maintain a predetermined small gap between the heating wires and the upstream end face of the filter.

7 Claims, 11 Drawing Figures

EXHAUST GAS CLEANING DEVICE FOR DIESEL ENGINES

BACKGROUND OF THE INVENTION (1) Field of the Invention

This invention generally relates to an exhaust gas cleaning device for diesel engines of motor vehicles and more particularly relates to a device having filter means capable of physically catching carbon particles or the like (hereinafter referred to as exhaust particles) contained in the exhaust gas and means for burning and removing periodically the caught exhaust particles, thereby regenerating the capability of the filter means.

(2) Description of the Prior Art

Exhaust particles in the exhaust emissions of diesel engines contain considerable amounts of combustible substances, such as carbon particles or the like, as well as other harmful substances. Hitherto, various kinds of devices have been proposed and used for catching such combustible particles by using an appropriate filter element and then burning and removing the caught particles in order to regenerate the capability of the filter element. Especially, a method is conventionally known for providing electric heaters on the surface of the filter material to ignite the exhaust particles attached thereto and to introduce the energy thus released to the inside area of the filter to burn the exhaust particles accumulated therein.

In a conventional exhaust gas cleaning device having electric heaters, the heating elements are directly attached to the upstream end face of the filter member in order to easily burn the exhaust particles accumulated therearound. Under such an arrangement of the heater elements, when the trap case is subjected to engine vibration, since the trap case is directly connected to the exhaust pipe of the engine and therefore the engine vibration is easily transmitted thereto, the heating elements and the front face of the filter may scrub each other, which results in all of these elements being worn. Finally, the heating elements may be broken or a considerable gap may be formed between the heating elements and the front face of the filter, which makes the burning of particles difficult under the preset power, since the preset power is predetermined on the basis of the condition that the heating elements always contact the filter material.

SUMMARY OF THE INVENTION

An object of the present invention is to provide a cleaning device for exhaust particles of a diesel engine capable of overcoming the defects mentioned above.

Another object of the present invention is to provide a cleaning device for exhaust particles of a diesel engine, in which device durability and safety are increased.

According to the present invention, there is provided a cleaning device for exhaust particles of a diesel engine comprising: a trap case provided in a flow conduit for the exhaust gas; a filter material disposed in the trap case so that carbon particles or other exhaust particles contained in the exhaust gas can be caught in the filter material when the exhaust gas is passed through the filter material; an electric heater comprising a plurality of heating elements spread over the upstream end face of the filter material so that the exhaust gas passes through the areas between the plurality of heating elements; and means for supporting the plurality of heating elements so as to maintain a predetermined small gap between the heating elements and the upstream end face of the filter material in the direction of the exhaust gas flow, at least a major part of the supporting means being made of heat-insulating material. Appropriate electric power should be given to the heating elements so as to readily ignite the exhaust particles accumulated on the front or upstream face of the filter material over the predetermined small gap.

The electric heater element may comprise a plurality of heating wires or rods each extending in parallel to the upstream end face of the filter material, and the supporting means may comprise a plurality of heat-insulating arms extending in parallel to the upstream end face of the filter material, each arm having a plurality of transverse grooves through which the heating wires or rods pass.

According to an embodiment of the present invention, the supporting means further comprises spacer cap insulators arranged along the arms, each spacer cap insulator having a plurality of transverse grooves corresponding to the grooves of the arms to define holes into which the heating wires or rods are inserted when the spacer cap insulator is attached to the corresponding arm.

According to another embodiment, the supporting means further comprises insulator supporting rods, each arm having a longitudinal recess over the plurality of grooves thereof and each insulator supporting rod being arranged through the recess of each of the arms to restrain the heating wires within the respective grooves of the arm. Each insulator supporting rod may consist of a heatproof stainless steel rod and a ceramic insulator tube into which the rod is inserted.

According to a further embodiment, each arm has a plurality of transverse dovetail grooves into which insert members, each having a shape corresponding to the dovetail groove, are fixedly fitted, and each insert member has a groove cooperating with the dovetail groove to restrain the heating wire or rod therewithin.

According to still another embodiment, each arm comprises two insulating arm halves each having a plurality of corresponding transverse grooves, and each pair of grooves of the respective arm halves are differently inclined with respect to each other so as to define respective through holes into which the heating wires or rods are inserted when the two arm halves are united.

According to still a further embodiment, each transverse groove of the arm has a substantially L-shaped cross section consisting of a groove portion extending perpendicular to the longitudinal direction of the arm and a notch portion extending in parallel thereto from the bottom of the perpendicular groove portion so as to form a hook, and the heating wire or rod is inserted into the notch portion after being stressed or tensioned toward the opposite side of the perpendicular groove portion.

DESCRIPTION OF THE PREFERRED EMBODIMENTS

Figure 1:
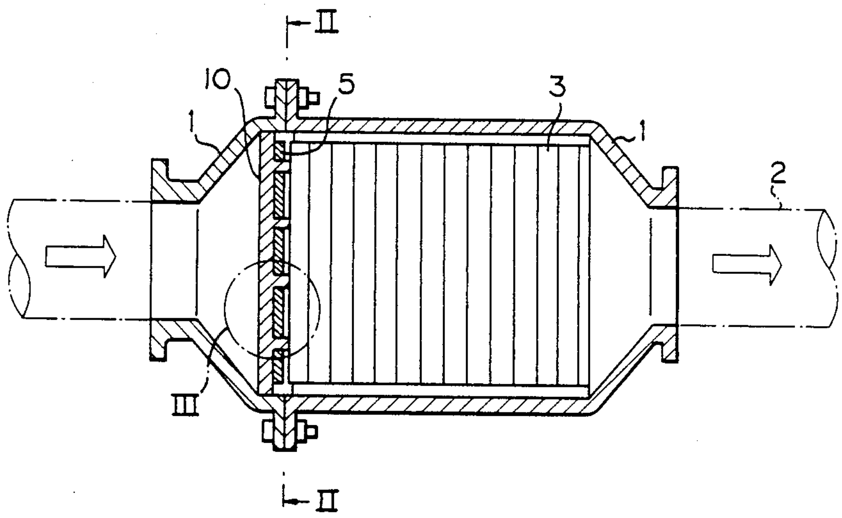
FIG. 1 is a cross-sectional view of a trap case or exhaust gas cleaning device according to the present invention.

Referring now to FIG. 1, a trap case 1 is located at an appropriate position in an exhaust flow conduit 2, in which exhaust gas of a diesel engine flows in the direction shown by the arrows. The trap case 1 may be, however, located at the downstream area of or near to a collecting portion of an exhaust manifold (not shown). The trap case 1 may also be formed integrally with the exhaust manifold by a means such as molding.

In the trap case 1, a trap material or filter element 3 and an electric heater 5 are provided. Any suitable ceramic foam known in the art or other similar ceramic materials can be used as the filter material 3. In other words, the filter material 3 is a three-dimensional mesh structure through which exhaust gas can be freely passed, and the exhaust particles contained in the exhaust gas can be trapped or caught in the mesh structure.

Figure 3:
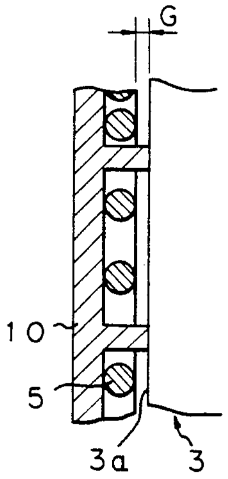
FIG. 3 is an enlarged view of a main portion indicated by III in FIG. 1.

At the upstream side of the filter material 3, the electric heater 5 is supported by a spacer supporting means 10 so that it is spaced from the front or upstream face of the filter material 3 by a small gap G, as can be seen in detail in FIG. 3. In order to reduce the consumption of electricity, it is advantageous to arrange the heater 5 so that the gap G is as small as possible, provided that the heater 5 does not come into contact with the filter material 3 when the engine vibrates.

Figure 2:
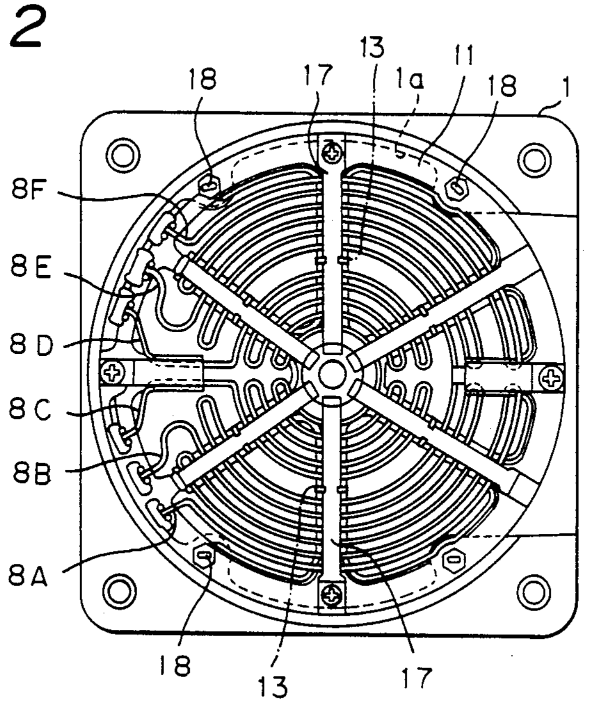
FIG. 2 is an enlarged view of the arrangement of the electric heating elements taken along line II—II in FIG. 1.

As is shown in FIG. 2, the electric heater 5 comprises a plurality of, e.g., six heater elements or wires 8A to 8F which are arranged along coaxial circles. This arrangement of heater elements is only an example, and various other shapes and arrangements are possible.

In FIG. 2, the heater 5 or heater elements 8A to 8F are supported by a circular-shaped supporting insulator or ceramic member 11 mounted by its peripheral portion on a flange 1*a* of the trap case 1 by means of a plurality of bolts 18. The supporting insulator 11 has six arms 13 extending radially from the center thereof and arranged at equidistant angles. Each heater element 8A to 8F is supported between a radial arm 13 of the insulator member 11 and a gap spacer member 17.

Various embodiments of spacer supporting means for rigidly securing the heater 5 to keep the gap G spaced from the front or upstream end face of the filter material 3 will now be described in detail with reference to FIGS. 4 through 11, each showing portions of the radial arm 13 and the gap spacer member 17.

Figure 4:
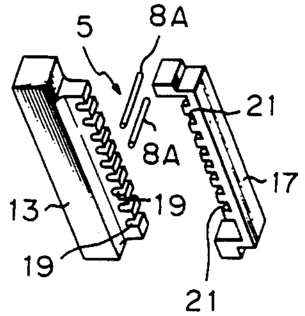
FIG. 4 is a perspective view of a first embodiment of heater supporting means used in the present invention.
Figure 5:
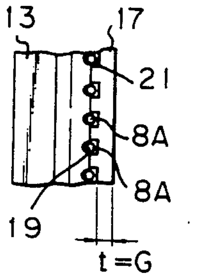
FIG. 5 is a plan view of the supporting means shown in FIG. 4.

In the embodiment shown in FIGS. 4 and 5, the arm 13 has a plurality of transverse grooves 19, the number of which corresponds to the number of heater wires passing therethrough. After the heater wires are placed in the respective grooves 19 of the arm 13, the ceramic spacer cap insulator 17 also having a plurality of grooves 21 corresponding to the arm grooves 19 is fixedly attached to the arm 13 by means of an adhesive, such as a heatproof inorganic adhesive or other commercially available adhesives so that the heater wires are secured in the holes defined between the respective grooves 19 and 21. As can be seen in FIG. 5, the thickness t of the spacer cap member 17 at the grooves 21 provides a gap G between the filter member 3 and the heater 5.

Figure 6:
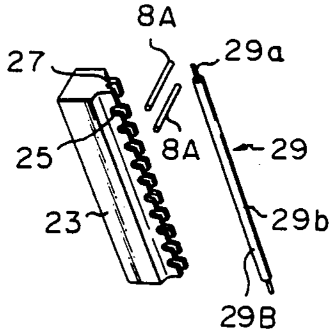
FIG. 6 is a perspective view of a second embodiment of heater supporting means used in the present invention.
Figure 7:
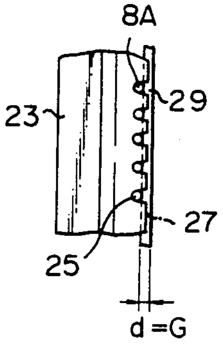
FIG. 7 is a plan view of the supporting means shown in FIG. 6.

FIGS. 6 and 7 illustrate a second embodiment of supporting means, in which the supporting insulator or arm 23 also has a plurality of transverse grooves 25 which are, however, deeper than the grooves 19 of the arm 13 of the first embodiment shown in FIGS. 4 and 5. The arm 23 also has a longitudinal recess 27 formed over all of the transverse grooves and perpendicular thereto. After the heater wires are placed in the respective grooves 25 of the arm 23, a supporting rod 29 is fixedly attached to the arm along the longitudinal recess 27 by means of a suitable adhesive, such as the one mentioned above. The supporting rod 29 may advantageously consist of a heatproof stainless steel rod 29*a* and a ceramic or insulator tube 29*b* into which the rod 29*a* is inserted. It should be noted that such a supporting rod 29 is more advantageous than a rod consisting of ceramic material only in regard to strength or durability in the case of shock or vibration. It is sufficient if the ceramic tube 29*b* exists only in the wire-bearing area of the supporting arm 23. In this embodiment, the diameter d of the supporting rod 29 provides the small gap G, as is illustrated in FIG. 7.

Figure 8:
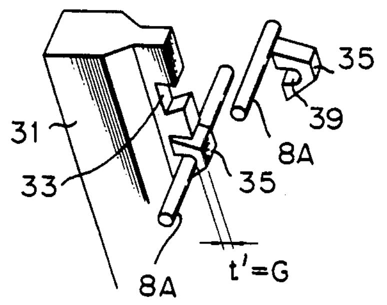
FIG. 8 is a perspective view of a third embodiment of heater supporting means.

FIG. 8 illustrates a third embodiment of supporting means, in which the supporting insulator or arm 31 has a plurality of dovetail grooves 33 into which insert members 35, made of suitable material, such as alumina ceramic or heatproof stainless steel, and having corresponding dovetail shapes, are fitted. Each insert member 35 is formed with a groove 39 for the heater wire 8A. In this embodiment, each insert member 35 can be fixedly inserted into each groove 33 by the dovetail engagement, and, therefore, any other fixing means such as an adhesive can be omitted. However, in order to reliably secure the insert member 35 to the groove 33, it is advantageous to use any suitable adhesive, such as a nonorganic adhesive, or to form any suitable claws or stoppers (not shown) to prevent the insert member 35 from coming out of the dovetail groove 33. In this embodiment, the thickness t' of the insert member 35 at the groove 39 provides the gap G shown in the figure.

Figure 9:
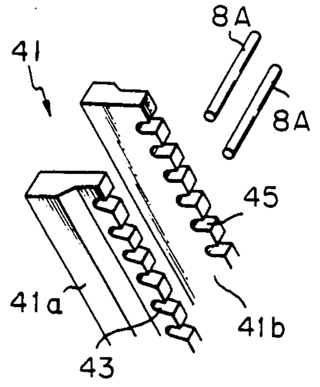
FIG. 9 is a perspective view of a fourth embodiment of heater supporting means.
Figure 10:
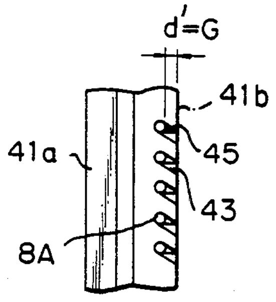
FIG. 10 is a plan view of the heater supporting means shown in FIG. 9.
Figure 11:
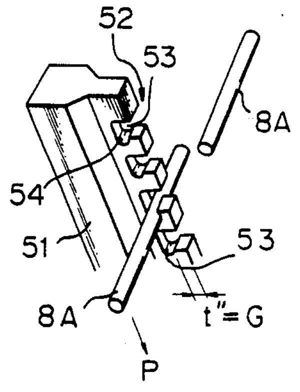
FIG. 11 is a perspective view of a fifth embodiment of heater supporting means.

FIGS. 9 and 10 illustrates a fourth embodiment of supporting means, in which the supporting insulator or arm 41 consists of two insulator arm halves 41*a* and 41*b* each having a plurality of corresponding grooves 43 and 45. Each pair of corresponding grooves 43 and 45 are inclined differently as is shown in FIGS. 9 and 10, the groove 43 being inclined in the longitudinal direction of the arm half 41*a* and the groove 45 being inclined perpendicular to the longitudinal direction of the arm half 41*b*. After the heater wire 8A is inserted into the grooves 43 and 45, the corresponding arm halves 41*a* and 41*b* are united as is shown in FIG. 10 so that the common open passage of the grooves 43 and 45 is blocked and the heater wire 8A can no longer be moved rightward in FIG. 10 but is restrained in a predetermined position. In this embodiment, the depth d' of the grooves 43 and 44 provides the small gap G as is shown in FIG. 10. FIG. 11 illustrates a fifth embodiment of supporting means, in which the supporting insulator or arm 51 has a plurality of substantially L-shaped grooves 52 each consisting of a groove portion 53 extending perpendicular to the longitudinal direction of the arm 51 and a groove or notch portion 54 extending in parallel thereto from the bottom of the perpendicular groove portion 52 to form a hook. The heater wire 8A is inserted into the notch portion 54 after under being stressed or tensioned in the direction indicated by the arrow P so that the heater wire 8A is prevented from being removed from the notch portion 54 of the groove 52. The arm 51 and the heater wires are advantageously arranged so that the direction of expansion of the heater wires corresponds to the direction P when heater wires are subjected to heat expansion. In connection with this, if the heater wires are arranged as is shown in FIG. 2, the insulator arm should be so placed that the notch portion 54 is located radially outward of the groove 53. In this embodiment, the thickness t'' of the insulator arm 51 at the hook formed by the notch portion 54 provides the small gap G.

We claim:

1. An exhaust particle cleaning device for a diesel engine comprising:

a trap case having a gas inlet and a gas outlet provided in a flow conduit for the flow of exhaust gas therethrough;

a filter material having an upstream end face disposed in said trap case adjacent said gas inlet so that carbon particles or other exhaust particles contained in the exhaust gas an are caught within said filter material when the exhaust gas passes through said filter material;

an electric heater comprising a plurality of heating elements spaced over the upstream end face of said filter material to define areas between said plurality of heating elements through which areas the exhaust gas passes;

each of said electric heater elements comprising a heating wire or rod extending parallel to the upstream end face of the filter material;

means for supporting said heating elements comprising a plurality of heat-insulating arms extending parallel to and having faces adjacent the upstream end face of said filter material, a face of each arm having a plurality of transverse grooves through which the heating wires or rods pass, and means for holding each of said heating wires or rods in each of said transverse grooves so as to maintain a predetermined small gap between the heating wires or rods and the upstream end face of the filter material in the direction of the exhaust gas flow.

2. A device as set forth in claim 1, wherein said holding means comprises a spacer cap insulator arranged along each of said arms, each spacer cap insulator having a plurality of transverse grooves corresponding to the grooves of said arm to define holes into which the heating wires or rods are inserted when the spacer insulator is attached to the corresponding arm.

3. A device as set forth in claim 1, wherein said holding means comprises insulator supporting rods, each arm having a longitudinal recess over the plurality of grooves thereof, and each insulating supporting rod being arranged through said recess of the arm to restrain the heating wires or rods within the respective grooves of said arm.

4. A device as set forth in claim 3, wherein each said insulator supporting rod is a heatproof stainless steel rod and a ceramic or insulator tube into which said rod is inserted.

5. A device as set forth in claim 1, wherein each arm has a plurality of transverse dovetail grooves into which insert members, each having a shape corresponding to the dovetail groove, is fixedly fitted, each of said insert members having a groove cooperating with said dovetail groove to restrain the heating wire or rod therewithin.

6. A device as set forth in claim 1, wherein each arm comprises two insulating arm halves united to form said arm, each arm half having a plurality of corresponding transverse grooves, and each pair of grooves of the respective arm halves are differently inclined with respect to each other so as to define respective through holes into which the heating wires or rods are positioned.

7. A device as set forth in claim 1, wherein each transverse groove of each arm has a substantially L-shaped cross-section consisting of a groove portion extending perpendicular to the longitudinal direction of the arm and a notch portion extending in parallel thereto from the bottom of said perpendicular groove portion so as to form a hook, and the heating wire or rod is positioned in the notch portion after being stressed or tensioned toward the opposite side of the perpendicular groove portion.

* * * * *